United States Patent Office 2,992,933
Patented July 18, 1961

2,992,933
PROTEIN FIBER AND METHOD
Michael M. Besso, Bethlehem, Pa., Alfred F. Diorio, Washington, D.C., and Walter L. Hochner, Jamaica, N.Y., assignors to National Lead Company, New York, N.Y., a corporation of New Jersey
No Drawing. Original application Mar. 25, 1957, Ser. No. 648,002. Divided and this application Mar. 6, 1958, Ser. No. 719,487
3 Claims. (Cl. 106—154)

This invention relates to novel protein fibers and to methods for preparing the same. In particular, this invention relates to fibers made by solubilization, spinning and coagulation of natural proteins such as linseed protein.

Many methods have been proposed for solubilizing and regenerating natural proteins, wherein the regeneration is accomplished under controlled conditions to convert the protein to a fibrous form similar to natural protein fibers, e.g. wool. The properties of fibers made according to these processes vary widely, depending partly on the composition of the protein itself and partly on the conditions of treatment, and the manufacture of synthetic protein fibers is still a largely empirical operation.

One method heretofore proposed for the manufacture of protein fibers was to dissolve the natural protein material in alkali and extrude the alkali solution through spinnerets or the like into an acid bath. The acid in the spinning bath neutralized the alkali and precipitated the protein in the filamentary form given it by the spinning operation. Such filamentary materials were then washed free of the salt, acid and/or alkali, stretched to orient the molecules of the fiber, and subjected to various treatments such as immersion in formaldehyde solution, etc., in order to "set" the fibers in the oriented state, thereby producing a strong, stable protein fiber. Such methods were quite successful in many respects, but suffered from certain disadvantages. Frequently, for example, the alkali solution was unstable, and could not be stored for any length of time without danger of premature gelation, or degradation of the protein.

Another previously proposed process involves no actual dissolution, but merely a dispersion of the protein in water, aided by the presence of large amounts of wetting agents, for example an amount equal to the weight of protein, followed by extrusion of the dispersed protein into a salt bath. The salt bath coagulates the protein in its extruded filamentary form, and the resulting fiber is stretch-oriented, washed free of detergent and set and dried in a manner analogous to that employed with protein fibers spun from alkali solutions. This procedure, also, was acceptable in most respects, but also suffered from some disadvantages, among which may be mentioned the necessity of washing with acetone or the like to remove the detergent from the spun fiber. If this was not done, the detergent caused the fibers to fuse together into a form approaching that of a monofilament, thereby losing the desired properties.

In addition to the above disadvantages, many of the processes heretofore proposed suffered from the additional disadvantage that they depended upon the use, as raw materials, of proteins suitable for human consumption, e.g. casein, egg albumin, peanut protein, etc.

An object of this invention, therefore, is to provide an improved protein fiber. Another object is to provide an improved method for the preparation of such a fiber. Still another object is to provide a method for the production of protein fibers which employs a spinning dope capable of being stored for appreciable lengths of time. A further object is to provide a method for the preparation of protein fibers which does not require removal of detergents from the fiber after the spinning operation. A still further object is to provide a method as aforesaid, which does not depend on the use of raw materials suitable for use as human foodstuffs. Other objects and advantages will become apparent from the following more complete description and claims.

Broadly, this invention contemplates a method for the production of a fibrous protein material which comprises the steps of forming a mixture comprising a protein, an organic sulfonate detergent, a strong alkali and water, said protein being present in amount between 12 and 16% based on the weight of said mixture, said protein and said detergent being present in relative proportions between 77 parts by weight of protein to 23 parts of detergent and 83 parts by weight of protein to 17 parts of detergent, and said alkali being present in amount sufficient to impart to said mixture a pH between 11.8 and 11.9; passing said mixture through a constricted zone to form a filament thereof; immersing said filament in an acid-bath to coagulate said protein, thereby converting the same to a fiber; and stretching, curing, washing, and drying said fiber.

This invention also contemplates a textile fiber consisting essentially of a regenerated protein containing, in chemical combination therewith, an organic sulfonate.

Proteins in general may be converted to fibers by the process of this invention, provided they are capable of being solubilized by strong alkalis at a pH between 11.8 and 11.9. Among such proteins and proteinaceous materials containing them may be mentioned casein, egg albumin, blood serum albumin, collagen, gelatin, agar-agar, keratin and keratinous materials such as wool, animal and human hair, fur, feathers, fish scales and bones, and the like, as well as vegetable proteins such as soy bean and peanut proteins, castor bean protein, and particularly linseed protein.

Methods for extracting such proteins from natural proteinaceous materials are well known in the art. In the case of linseed and castor bean proteins, a most effective method is the extraction with NaOH or $Na_2S$ of the meal remaining after the extraction of the linseed or castor oil, and the subsequent reprecipitation of the protein with a suitable agent such as sulfur dioxide.

The organic sulfonate detergent may in general be any of this well-known class of detergents, including both alkyl and aryl sulfonates wherein the alkyl or aryl group, respectively, is sufficiently large to impart a hydrophobic, organophilic nature to the organic portion of the molecule. Such detergents are discussed, for example, in U.S. Patent No. 2,425,550, column 2, line 52 to column 3, line 18. Among the preferred detergents there mentioned, which are also preferred in the practice of the present invention, are commercial sodium alkyl benzene sulfonate wherein the alkyl group contains from 12 to 18 carbon atoms, sodium decyl benzene sulfonate, sodium dodecyl benzene sulfonate, and polyalkyl monosodium benzene sulfonates where the sum of the carbon atoms in the several alkyl groups is in the neighborhood of 10. Also sodium isopropyl naphthalene sulfonates, and other organic sulfonates such as sulfonated castor oil. These sulfonates will normally be employed as the sodium organic sulfonates, although the organic sulfonates of other alkali metals or the organic sulfonic acids themselves may be employed if desired.

The concentration of protein in the spinning dope (i.e. the mixture of protein, detergent, alkali and water) should be not less than about 12 nor more than about 16 percent by weight, based on the weight of the dope. If the concentration is too low, i.e., below about 12% by weight, the resulting fiber will lack strength. If the concentration is higher than about 16%, on the other hand, it will be difficult or impossible to put the protein in solution.

The ratio of detergent to protein is critical. If there is less than about 17 parts by weight of detergent for every 83 of protein, it is impossible to secure satisfactory colloidal dispersion of the protein, and the protein will either gel and be impossible to spin, or at best will spin to a non-homogeneous filament lacking sufficient strength to be stretch-oriented and incapable of forming a fiber. On the other hand, if the ratio is higher than about 23 parts of detergent to 77 parts of protein, it is necessary to remove the detergent by a subsequent acetone wash or equivalent operation, for if such large amounts of detergent are left in the fiber, the fibers will fuse together during subsequent treatment.

In the process of this invention, such fusion does not take place because of the relatively smaller amount of detergent employed, and it is consequently unnecessary to remove the detergent by a subsequent acetone extraction or equivalent operation. Not only unnecessary, it is undesirable to resort to such an extraction or to remove the detergent in any way, for according to this invention, about two-thirds of the detergent actually becomes a part of the spun fiber forming thereby a protein detergent fiber in a ratio between about 85 parts of protein to about 15 parts of sulfonate and about 89 parts of protein to about 11 parts of sulfonate. Somewhat surprisingly, the presence of the detergent, once it has been incorporated into the molecule, actually enhances the water-repellancy of the finished fiber. The reason is believed to be that the sulfonic acid portion of the detergent, which normally contributes hydrophilic properties, is blocked by reaction with hydroxymethyl or similar groups in the protein molecule, while the hydrophobic organic portion of the detergent, instead of the original hydroxymethyl or other hydrophilic group, is presented as the "surface" of the fiber.

The pH of the solution is highly critical. If the pH of the protein solution is higher than about 11.9 degradation of the protein will occur, accompanied by a drop in viscosity, making extrusion impossible.

If, on the other hand, the pH of the protein solution is less than about 11.8 the protein-detergent complex will be too thick for extrusion and gelation will occur within a few hours. The pH is controlled by the concentration of alkali. The exact amount of alkali required to establish the necessary pH condition will vary somewhat depending on the choice and concentration of the other ingredients of the mixture, and of course upon the particular alkali chosen. In the case of NaOH, amounts between 4% and 6% are generally required to produce the required pH. The amount of alkali should be controlled, however, by direct measurement of the pH.

As suggested above, any strong alkali may be used in the process of this invention. Ordinarily, however, there is no advantage in using any but the most abundant one, viz. NaOH.

The operation of forming a liquid filament of the protein solution and of coagulating the liquid filament in an acid bath to form a fiber may best be carried out according to techniques familiar to the art, e.g. by forcing the solution through a submerged spinneret directly into an acid spinning solution. A suitable acid bath for this purpose is dilute sulfuric acid, having a pH of about 1.0. Preferably, the acid solution is saturated with a salt such as $MgSO_4$ in order to prevent swelling.

The fiber is then removed from the spinning bath and washed to remove excess sulfuric acid and salts. At this point, the fiber is ready to be stretch-oriented. It is preferable, although not always necessary, to subject the fiber before stretching to a pre-cure delay treatment, which partially hardens the fiber, and gives it additional strength to withstand breakage during the stretching. A suitable treatment for this purpose consists of a 5-minute immersion at 30° C. in a bath containing 10% aluminum sulfate, 10% sodium sulfate and 1.5% formaldehyde.

If the pre-cure delay treatment is employed, it is followed by another wash and then stretch-oriented. The stretching is also a technique well known to the art and need not be described in detail. It has been found satisfactory to employ a 500% stretch. During the stretching, the fiber is preferably sprayed with a salt solution, e.g. 30% $Na_2SO_4$ at 70° C., for the purpose of facilitating the stretching operation. If the filaments were not kept moist at this stage, they would not take the necessary amount of stretch. The salt is used to prevent any possible swelling.

After stretching, the fiber is cured on curing reels or the like, under the slight tension developed in preventing shrinkage of the fiber at this stage. A five-hour curing period suffices, if carried out at the proper temperatures, as described later.

During curing, the fibers are set in their stretch-oriented configuration by treatment with a strong HCl bath, saturated with an alkali chloride such as NaCl, and containing a suitable setting agent. A suitable setting solution consists of 1.5% HCl, 25–30% NaCl and 2% formaldehyde. Preferably, the exact conditions employed for the setting operation should be determined experimentally for the particular fiber being treated. For most of the protein fibers, when using the setting solution just described, a suitable set can be obtained by a five-hour setting cycle, in which the temperature is gradually and steadily increased from 45° C. at the start to 70° C. at the end. Alternatively, a similar set can be obtained by treatment for a longer period at lower temperatures, e.g. 16 hours at a steady temperature between 45 and 50° C. These conditions may be varied somewhat to accommodate the characteristics of the particular fiber. Too stringent or too mild a cure, however, results in brittle fibers having a harsh hand, poor flex-stability, and a tendency to disintegrate and dust when being worked. The setting conditions may be made less stringent either by decreasing the time or the temperature of the cure, or the concentration of HCl or formaldehyde in the setting solution, as may be most convenient, or may be made more stringent by changing any of these variables in the opposite direction.

After curing, the fiber is washed and dried, using scouring agents, softeners, etc. as may be desired. If desired, the fiber can be crimped at this stage to aid in subsequent processing.

In order to more fully illustrate the nature of this invention and the manner of practicing the same, the following examples are presented:

*Example 1*

A protein-water slurry was prepared by mixing 100 parts by weight of linseed protein and 715 parts by weight of water. To the resulting slurry were added 33 parts by weight of a commercial mixture of sodium alkyl benzene sulfonates in which the alkyl groups range from $C_{12}$ to $C_{18}$. A small amount (0.05 part) of a commercial antistatic agent (polyoxyethylene sorbitan monolaurate) was also added to assist in subsequent handling. The resulting slurry was then solubilized by slow addition, under agitation at room temperature, of 3 N.NaOH. The addition of NaOH was continued until the pH had reached 11.9. The product was a clear homogeneous spinning dope.

The spinning dope was extruded through a 5000-hole, 100-micron spinnerette at a rate of 34 feet per minute into an acid-salt coagulating bath.

The acid-salt coagulating bath consisted of an aqueous solution of 3% sulfuric acid, saturated with magnesium sulfate, and containing 0.1% of the same antistatic agent. The pH of the coagulating bath was 1.0. The bath was maintained at a temperature of 25° C. and the residence time of the extruded filament therein was approximately 2 seconds.

After emerging from the coagulating bath, the fiber was washed by passing it through a water bath and then subjected to a pre-cure delay treatment which consisted of a five-minute immersion in a bath containing 10% aluminum sulfate, 10% sodium sulfate and 1.5% formaldehyde.

The fiber was again washed and then stretched by passing it over a series of rolls of increasing diameter, to approximately 500% of its original length. During the stretching, the fiber was sprayed with a 30% solution of sodium sulfate at 70° C.

The stretched fiber was then cured by winding it on a curing reel and immersing the reel for five hours in a setting solution consisting of an aqueous solution of 1.5% HCl, 25% NaCl and 2% formaldehyde. During the curing cycle, the temperature of the solution was gradually raised from 45° C. at the start to 75° C. at the end of the cycle. The fiber was then removed from the setting bath and washed and dried in conventional manner.

The dry fiber was crimped and cut into staple of approximately 1½ inch length, then carded, drawn off as a roving, and twisted into yarn, all in conventional manner. The yarn was dyed in 2% guinea Green BA. It accepted the dye readily, giving an attractive, uniform green color. The dyed yarn was knitted into a sweater which was found to possess an excellent soft cashmere-like hand and good warmth.

The tensile strength of the dry fiber was approximately 19,000 lbs./in.$^2$ and had an elongation at break of 25%. In the wet condition, the fiber had a tensile strength of 13,500 lbs./in.$^2$ and an elongation of about 35 to 40%.

*Example 2*

The procedure of Example 1 was repeated, except that only 20 parts of detergent were employed. The spinning dope was more viscous than that of Example 1, but was still spinnable. The properties of the finished material were substantially identical with those described in Example 1, but the spinning dope was less stable on storage, having a useful life about half that of the dope described in Example 1.

*Example 3*

The procedure of Example 1 was again repeated, except that the curing step was carried out for a period of 16 hours at 45° C., instead of 5 hours at a gradually rising temperature. The properties of the finished product were substantially identical with those described in connection with Example 1.

*Example 4*

The procedure of Example 1 was followed, except that instead of being used immediately, the spinning dope was aged for 2 days at 25° C. before being spun. There was a small amount of protein degradation noticeable in the thinning of the spinning dope and in a slight loss of tensile strength in the finished product. The dope was still spinnable, however, and the loss of tensile strength was not serious.

*Example 5*

The procedure of Example 1 was employed, substituting 100 parts of castor bean protein for the linseed protein of Example 1. The product was an acceptable textile fiber.

Protein fibers made according to the present invention are made from inexpensive raw materials, and possess properties equivalent, and in some cases superior, to known natural and synthetic textile fibers. They have good tensile strength and elongation, excellent acid and alkali resistance, pleasant hand, and are readily dyed in conventional dye systems. Yarns made from the fibers of this invention may be knitted into soft cashmere-like materials particularly useful in sweaters and the like, or woven to produce fabrics suitable for sport jackets, scarves, etc. Blended with other fibers such as wool, rayon, etc., they tend to improve the hand of the fabric, and are particularly useful in fabrics for slacks, overcoats and the like. The process is simple and inexpensive to operate.

This application is a division of our copending application Serial No. 648,002, filed March 25, 1957.

While this invention has been described with reference to particular preferred embodiments and illustrated by certain examples, these are illustrative only, and the invention is not to be construed as limited, except as set forth in the following claims.

We claim:

1. A textile fiber consisting essentially of a regenerated protein and an alkyl aryl sulfonate detergent, in a ratio between about 85 parts of protein to about 15 parts of sulfonate and about 89 parts of protein to about 11 parts of sulfonate.

2. A fiber, according to claim 1, wherein said regenerated protein is a linseed protein.

3. A fiber, according to claim 1, wherein said alkyl aryl sulfonate is a sodium alkyl benzene sulfonate in which the alkyl group contains from 12 to 18 carbon atoms.

References Cited in the file of this patent

UNITED STATES PATENTS

| | | |
|---|---|---|
| 2,459,708 | Lundgren | Jan. 18, 1949 |
| 2,625,490 | Caldwell | Jan. 13, 1953 |

OTHER REFERENCES

Anson: Advances in Protein Chemistry, vol. IV, pages 86 and 87 (1948).